(12) United States Patent
Bernal et al.

(10) Patent No.: US 8,582,909 B2
(45) Date of Patent: Nov. 12, 2013

(54) ADAPTIVE MULTI-GRID CONTRAST OPTICAL FLOW

(75) Inventors: Ariel J. Bernal, Kitchener (CA); Ashok Thirumurthi, Waterloo, CA (US); Michael McCool, Waterloo (CA); Tyler B. Nowicki, Kitchener (CA); Hans Pabst, Wittenberg (DE)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 13/113,133

(22) Filed: May 23, 2011

(65) Prior Publication Data

US 2012/0301051 A1    Nov. 29, 2012

(51) Int. Cl.
  *G06K 9/40*    (2006.01)

(52) U.S. Cl.
  USPC ............ 382/254; 348/607; 358/447; 345/589

(58) Field of Classification Search
  USPC .......... 382/100, 254, 274, 275; 348/251, 254, 348/606–624; 358/1.9–3.31, 447, 461, 463; 250/205; 345/20, 63, 77, 581–618, 345/690–697
  See application file for complete search history.

(56) References Cited

U.S. PATENT DOCUMENTS

| | | | |
|---|---|---|---|
| 5,500,904 A * | 3/1996 | Markandey et al. | 382/103 |
| 5,557,684 A * | 9/1996 | Wang et al. | 382/107 |
| 6,345,106 B1 * | 2/2002 | Borer | 382/107 |
| 6,539,126 B1 * | 3/2003 | Socolinsky et al. | 382/274 |
| 6,990,252 B2 * | 1/2006 | Shekter | 382/276 |
| 7,548,659 B2 * | 6/2009 | Ofek et al. | 382/254 |
| 2002/0034337 A1 * | 3/2002 | Shekter | 382/275 |
| 2004/0208385 A1 * | 10/2004 | Jiang | 382/254 |
| 2010/0272311 A1 * | 10/2010 | Nir et al. | 382/100 |

OTHER PUBLICATIONS

Brox, et al., "High accuracy optical flow estimation based on a theory for warping", LNCS, May 2004, vol. 4, pp. 25-36.
Ebrahimi, et al., "Image registration under varying illumination: Hyper-demons algorithm", Lecture Notes in Computer Science, 2009, pp. 303-316.
Martel, et al., "Evaluating an optical-flow-based registration algorithm for contrast-enhanced magnetic resonance imaging of the breast", Physics in Medicine and Biology, Jul. 2007, vol. 52, pp. 3803-3816.

* cited by examiner

*Primary Examiner* — Anand Bhatnagar
(74) *Attorney, Agent, or Firm* — Lynch Law Patent Group, P.C.

(57) ABSTRACT

Systems and methods for applying a contrast optical flow algorithm to fixed image data and moving image data are disclosed. Applying the contrast optical flow algorithm may include determining a deformation field and a scalar brightness field. Applying the contrast optical flow algorithm may also include applying an affine transformation to changes in intensity between the fixed image data and the moving image data.

20 Claims, 4 Drawing Sheets

ADAPTIVE MULTI-GRID CONTRAST OPTICAL FLOW

BACKGROUND

Optical Flow (OF) generally refers to the apparent motion of brightness patterns in a sequence of images. OF techniques may be employed to estimate and correct for motion artifacts within, for example, image sequences and are often used in computer vision applications. A classical OF solution for the displacement between a fixed image f and a moving image g satisfies the following well-known equation:

$$\Delta r = \Delta \bar{r} - \nabla f(r) \frac{[g(r + \Delta \bar{r}) - f(r)]}{\lambda_s + \|\nabla f(r)\|^2}$$

where $\Delta r$ is the total displacement between the images, and $\lambda_s$ is a regularization parameter. Larger values of $\lambda_s$ may allow for smoother solutions.

Conventional OF techniques assume that changes in image content are only due to motion. Thus, in conventional OF techniques, a 3D-velocity vector may describe pixel intensity values and the intensity values may be assumed to remain unchanged over small time intervals. However, correcting for artifacts related to local variations in image contrast, as might be encountered in comparing, for example, medical images taken with and without contrast agents, may not be amenable to conventional OF techniques employing classical solutions such as the above equation.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
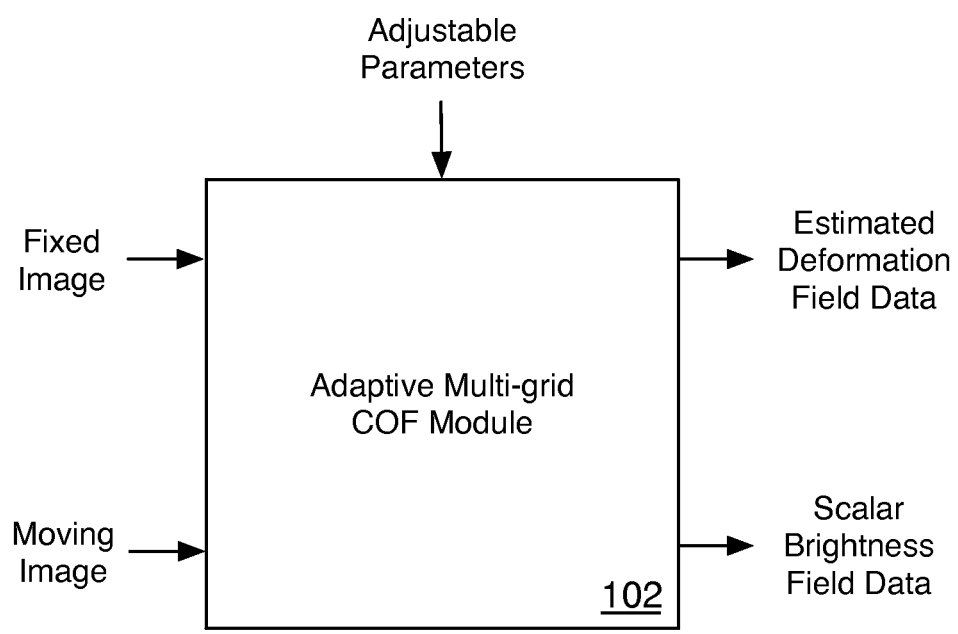
FIG. 1 is an illustrative diagram of an example system.

One or more embodiments are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Adaptive Multi-Grid Contrast Optical Flow

In accordance with the present disclosure, let $f:\Omega \mapsto \Re$ be a fixed image and $g:\Omega \mapsto \Re$ be a moving image where both images are defined in a bounded domain $\Omega \in \Re^d$. An intensity function $E:\Omega \times \Re \mapsto \Re$ may be defined such that for a given $t_0 \in \Re$, $E(r,t_0)=f(r)$ and $E(r,t_0+\Delta t)=g(r+\Delta r)$, where $\Delta r$ is the total displacement and t corresponds to real time.

In accordance with the present disclosure, an adaptive multi-grid contrast optical flow (COF) approach may be described by the following expression:

$$E(r+\delta r, t+\delta t) = M(r,t)E(r,t) + C(r,t), \quad (1)$$

with $$M(r,t) = 1 + \delta m(r,t)$$

$$C(r,t) = \delta c(r,t) \quad (2)$$

where E is the intensity function, M is a contrast shift scale factor, C is a contrast shift offset factor, r is a space-varying deformation vector in three-dimensional space ($R^3$) and t is time. The contrast shift functions M and C define an affine mapping or transformation of intensity changes between the fixed and the moving image that may vary in space and time.

In circumstances where the offset term C(r,t) of Eqn. (1) may be substantially negligible, Eqn. (1) may reduce to:

$$E(r+\delta r, t+\delta t) = M(r,t)E(r,t). \quad (3)$$

Applying Eqn. (3), the following Taylor expansion $$E(r+\delta r, t+\delta t) = E(r,t) + \frac{\partial E}{\partial r} \cdot \delta r + \frac{\partial E}{\partial t} \delta t + O(\varepsilon), \quad (4)$$

dividing by δt and introducing derivative notation, the following expression may be obtained:

$$E_r \cdot r_t + E_t - Em_t = 0 \quad (5)$$

where the vector $r_t$ is the instantaneous displacement or deformation field that, integrated over time and used to parametrize to the moving image g, may approximate the fixed image f.

Noting that $$\int_{t_0}^{t_1} m_t dt = \Delta m. \quad (6)$$

Integrating Eqn. (5) over t, the following expression may result $$\int_{t_0}^{t_1} [+E_r \cdot r_t + E_t] dt = \int_{t_0}^{t_1} Em_t dt. \quad (7)$$

Applying $$\int_{t_0}^{t_1} \left[\frac{dE}{dt}\right] dt = E(r,t_1) - E(r,t_0) = g \circ \phi(r) - f(r), \quad (8)$$

assuming that Δt=1, and taking the left Riemann sums, the following expression results $$g(r+\Delta r) - f(r) = f(r)\Delta m, \quad (9)$$

which may be expressed as $$\frac{g(r+\Delta r)}{1+\Delta m} \approx f(r). \quad (10)$$

where Δr is the deformation field and Δm is the scalar brightness field. If Δr and Δm may be calculated or computed, then it may be possible to reconstruct the fixed image f using Eqn. (10). However, when Δm→−1, which may occur with large changes in contrast, Eqn. (10) may become singular and instability may result.

To mitigate aperture issues which may cause Eqn. (5) to have multiple solutions, the following regularization constraints may be applied:

$$e_b = \int_\Omega (E_r \cdot r_t + E_t - Em_t)^2 dr, \quad (11)$$

$$e_s = \int_\Omega \|\nabla r_t\|^2 dr, \quad (12)$$

$$e = e_b + \lambda_s e_s + \lambda_m e_m. \quad (13)$$

permitting the minimization problem to take the form of $$e = e_b + \lambda_s e_s + \lambda_m e_m. \quad (14)$$

Applying the following system of Euler-Lagrange equations $$\nabla^2 u = \frac{E_x}{\lambda_s}(E_t + E_x u + E_y v + E_z w - Em_t), \quad (15)$$

$$\nabla^2 v = \frac{E_y}{\lambda_s}(E_t + E_x u + E_y v + E_z w - Em_t),$$

$$\nabla^2 w = \frac{E_z}{\lambda_s}(E_t + E_x u + E_y v + E_z w - Em_t),$$

$$\nabla^2 m_t = \frac{-E}{\lambda_m}(E_t + E_x u + E_y v + E_z w - Em_t).$$

and approximating the Laplacian operator $\nabla^2$ using the difference with the average operator $$\nabla^2 g \approx \kappa(\bar{g} - g) \quad (16)$$

where $\bar{g}$ is the average or a smooth version of g provided, for example, by convolution (*) with a Gaussian regularization function such that $$\bar{g}(x) = G(x) * g(x) \quad (17)$$

where $$G(x) = e^{-\|x\|^2/2\sigma^2} \quad (18)$$

is the Gaussian kernel, the following system of equations may be obtained $$\lambda_s \bar{u} - E_x E_t = (E_x^2 + \lambda_s)u + E_x E_y v + E_x E_z w - E_x Em_t,$$

$$\lambda_s \bar{v} - E_y E_t = E_x E_y u + (E_y^2 + \lambda_s)v + E_y E_z w - E_x Em_t,$$

$$\lambda_s \bar{w} - E_z E_t = E_x E_z u + E_y E_z v + (E_z^2 + \lambda_s)w - E_x Em_t,$$

$$\lambda_m \bar{m}_t - EE_t = -EE_x u - EE_y v - EE_z w + (E^2 + \lambda_m)m_t. \quad (19)$$

The system of Eqns. (19) may be solved to find $$h_t = \frac{E_r \bar{r}_t + E_t - E\bar{m}_t}{\lambda_m \lambda_s + \lambda_s E^2 + \lambda_m \|E_r\|^2} \quad (20)$$

and its integral $$\int_{t_0}^{t_1} h_t dt = \Delta h = \frac{g(r+\Delta r) - f(r) - E\Delta \bar{m}}{\lambda_m \lambda_s + \lambda_s E^2 + \lambda_m \|E_r\|^2}. \quad (21)$$

A solution may be provided in vector form as follows:

$$r_t = \bar{r}_t - \lambda_m E_r h_t,$$

$$m_t = \bar{m}_t + \lambda_s E h_t \quad (22)$$

Integrating over time provides the following expressions $$\Delta r = \Delta \bar{r} - \lambda_m E_r \Delta h,$$

$$\Delta m = \Delta \bar{m} + \lambda_s E \Delta h. \quad (23)$$

and $$\Delta \bar{r} = \Delta r * G,$$

$$\Delta \bar{m} = \Delta m * G. \quad (24)$$

Considering the left approximation of $E = f(r), E_r = \nabla f(r)$ and $\|E_r\|^2 = \|\nabla f(r)\|^2$, the following expressions may be obtained $$\Delta h = \frac{g(r+\Delta \bar{r}) - f(r)(1+\Delta \bar{m})}{\lambda_s \lambda_m + \lambda_s f(r)^2 + \lambda_m \|\nabla f(r)\|^2}, \quad (25)$$

$$\Delta r = \Delta \bar{r} - \lambda_m \nabla f(r) \Delta h \quad (26)$$

$$\Delta m = \Delta \bar{m} + \lambda_s f(r) \Delta h \quad (27)$$

In order to aid convergence and account for small values of the gradient, the first term in the denominator of Eqn. (25)

may be replaced by $\lambda_s=[g(r+\Delta r)-f(r)]^2$ in which case Eqn. (1) may be solved for a finite time-step resulting in the following set of equations:

$$\Delta h = \frac{g(r+\Delta \bar{r}) - f(r)(1+\Delta \bar{m})}{[g(r+\Delta \bar{r})-f(r)]^2 + \lambda_s f(r)^2 + \lambda_m \|\nabla f(r)\|^2}, \quad (28)$$

$$\Delta r = \Delta \bar{r} - \lambda_m \nabla f(r) \Delta h, \quad (29)$$

$$\Delta m = \Delta \bar{m} + \lambda_s f(r) \Delta h, \quad (30)$$

where f is the fixed image, g is the moving image, $\Delta r$ is the estimated deformation field or total displacement, $\Delta m$ is the scalar brightness field, and the adjustable parameters $\lambda_s$, $\lambda_m$ permit tuning of a COF algorithm based on Eq. (1) as will be explained in greater detail below. At one extreme, setting adjustable parameters $\lambda_s=0$, Eqns. (28)-(30) may collapse to a classical OF expression, while, at the other extreme, when adjustable parameters $\lambda_s$, $\lambda_m$ have a value of one, for example, Eqns. (28)-(30) may be solved for large changes in contrast. In some implementations, parameters $\lambda_s$, $\lambda_m$ may be automatically adjusted based on convergence estimates as will be explained in greater detail below. In various implementations, optical flow algorithms in accordance with the present disclosure may employ either Eqn. (25) or Eqn. (28).

In various implementations, COF algorithms based on Eqns. (25) or (28) may permit simultaneous computation of corrections for variations due both to deformation and varying contrast. In general, deformations change the local scale, which may be collapsed and/or expanded. This in turn may change the gradient. COF algorithms based on Eqns. (25) or (28) may estimate both general deformations and contrast shifts. In addition, COF algorithms based on Eqns. (25) or (28) may be suitable for single instruction, multiple data (SIMD) vectorization, parallelization over tiles and cache optimizations, and/or fusion of regularization steps during computation of contrast optical flow in accordance with the present disclosure.

In various implementations, COF algorithms based on Eqns. (25) or (28) may be solved using finite difference techniques. Assuming that the deformation is small and smooth the gradient may be calculated using central average differences where each partial derivative is defined by $$\frac{\partial f}{\partial x} = (\delta \mu)_x f_{i,j,k} = \frac{f_{i+1,j,k} - f_{i-1,j,k}}{2} \quad (31)$$

$$\frac{\partial f}{\partial y} = (\delta \mu)_y f_{i,j,k} = \frac{f_{i,j+1,k} - f_{i,j-1,k}}{2}$$

$$\frac{\partial f}{\partial z} = (\delta \mu)_z f_{i,j,k} = \frac{f_{i,j,k+1} - f_{i,j,k-1}}{2}$$

where $\delta = f_{i+1/2} - f_{i-1/2}$ is the central difference and $\mu = (f_{i+1/2} - f_{i-1/2})/2$ is the average difference operator. The present disclosure is, however, not limited to estimating partial derivatives using central average differences and, hence, other well-known methods for estimating partial derivatives may be employed in accordance with the present disclosure.

In various implementations, a COF algorithm based on Eqns. (25) or (28) may depend only on the value of the moving image that is being used. As a result, in some implementations the gradient of the fixed image may be pre-calculated when determining optical flow iteratively. An iterative optical flow algorithm may operate on a previous displacement to compute a new displacement as follows:

$$g(r+\Delta r^{n-1}). \quad (32)$$

where interpolation methods such as trilinear interpolation, spline interpolation, and the like may be employed to compute Eqn. (31). However, the present disclosure is not limited to pre-computation of the gradient field of the fixed image and, hence, in various implementations the gradient field of the fixed image may not be pre-calculated.

The temporal step $\Delta t$ of the contrast flow equations $$\Delta r = \Delta \bar{r} - \lambda_m \nabla f(r) \Delta h \Delta t, \text{ and} \quad (33)$$

$$\Delta m = \Delta \bar{m} + \lambda_s f(r) \Delta h \Delta t, \quad (34)$$

may be assumed to have the value $\Delta t=1$ and may be absorbed by the parameters $\lambda_m$ and $\lambda_s$. In addition, the values of $\sigma_s$ and $\sigma_m$ corresponding to the standard deviation of the Gaussian filter applied to the deformation field and the brightness shift may be set such that $\sigma_s=\sigma_m=1$. However, in various implementations, these values may be defined as parameters of the optical flow equation.

In various implementations, an optical flow operator $\Phi$ may be defined as $$(\Delta r, \Delta m) = \Phi_{\Delta r', \Delta m'}(f,g) \quad (35)$$

where $\Delta r'$ is the initial value of the displacement field and $\Delta m'$ is the initial value of the intensity shift. If the initial displacement or the initial intensity shift is not needed then the flow operator $\Phi(f,g)$ may be employed.

In various implementations, an algorithm may be employed that iteratively updates the optical flow deformation and contrast shifts until a metric threshold is achieved. For example, a threshold based on a real-time rate of convergence of the deformable registration algorithm may be applied. For example, a specific reduction in measured error or a rate of error reduction may be employed. Specifically, a stopping criteria or metric $\Gamma$ may be computed using the following pseudo code for an example deformable registration (DR) algorithm:

```
Require: f, g, Δr, Δm
Ensure: Δr, Δm ← c
    while φ(ε) < ε_c do
        Δr̄ ← G_s(r)* Δr
        Δm̄ ← G_m(r)* Δm
        Δr, Δm ← Φ Δr̄, Δm̄(f, g)
        ε ← Γ(f(r), g(r + Δr) / (1 + Δm))
    end while
    return (Δr, Δm)
``` where $\Delta r$, $\Delta m$ represent initialized inputs for each iteration.

In various implementations, the stopping criteria or $\Gamma$ function may be chosen as the mean squared error (MSE) or the root mean squared error (RMSE). In other implementations, a normalized mutual information (NMI) metric may be employed. Since the RMSE and the NMI metric are single values that apply to entire 3D datasets, localized artifacts may still remain undetected by these metrics. However, these metrics may indicate the number of iterations required at any resolution level as sharp changes occur when the flow stabilizes with iterative evolution. This characteristic may permit efficient switching between resolution levels when employing an algorithm in accordance with the present disclosure. The result of the metric may be stored in $\epsilon$ and may be evaluated by $\phi:R \to R$ as follows using the first derivative approximated, for example, by the five points stencil defined as $$\frac{d\varepsilon}{dt} \approx \frac{-\varepsilon(t+2) + 8\varepsilon(t+1) - 8\varepsilon(t-1) + \varepsilon(t-2)}{12} \quad (36)$$

where a minimum value $\epsilon_c$ may be estimated for the slope of the tangent and a stopping point or convergence limit of the DR algorithm may be based on that minimum value. In various implementations, other well-known methods may be used to estimate the first derivative.

Algorithms in accordance with the present disclosure are not limited to algorithms employing the example stopping criteria described herein and, hence, other stopping criteria may be employed in accordance with the present disclosure. For example, in some implementations, the reduction-in-error per unit-of-real-time may be found using the well-known chain rule, in other words, by multiplying the reduction-in-error per iteration by the iterations per unit-real-time.

Adaptive Multi-Grid Processing

In accordance with the present disclosure, software algorithms may be used to compute deformations between datasets. Determination of deformations may be based on a multi-grid extension of optical flow permitting localized linear shifts in contrast to be estimated. The computed deformations may warp one volume, the moving volume, so that an error metric is minimized when compared with another volume, the fixed volume. In various implementations a deformation may also include local (space-varying) adjustments to contrast.

An adaptive multi-grid COF algorithm in accordance with the present disclosure may use of a sequence of increasingly fine grids instead of a single full resolution grid. A multi-grid approach may be applied to iteratively solve the system of discrete equations. The coarser grids may be viewed as corrective grids that are used to capture the low frequency components and accelerate convergence on finer grids. A solution obtained at one level may be up-sampled and used as an initial solution for a next finer resolution level.

To implement a multi-grid technique, two sequences of successively sub-sampled sets of $f,g \in L^2$ defined by $\{f^0, f^1, \ldots, f^n\}$ and $\{g^0, g^1, \ldots, g^n\}$ where $f^i, g^i : \Omega^i \to \Re$ and $\Omega^0 \subset \Omega^1 \subset \ldots \subset \Omega^n = \Omega$ and $k^i = |\Omega^i|$ such that $0 < k_0 < k_1 < \ldots < k_n = 1$ may be applied. Note that $f^n(r) = f(r)$ and $g^n(r) = g(r)$. In various implementations, a mesh size ratio of $k_i/k_{i+1} = \frac{1}{2}$ may be employed. On each grid level, the problem may be approximated by $$(\Delta r^i, \Delta^i_m) = \Phi(f^i, g^i). \quad (37)$$

In implementations where the spatial frequency is less than $1/(2k_i)$, a coarser grid may be used as an approximation because high-frequency residuals may be lost during down-sampling. The relaxation procedure provided by $\Delta \bar{r} = \Delta r * G$ may be an effective way to reduce such residuals. Once the residual is smoothed out, the change in the metric may become insignificant and a change to a finer grid may be undertaken.

Various approaches may be used to measure the effectiveness of the multi-grid algorithm at capturing relevant information from iteration to iteration. In various implementations, the maximum absolute difference between displacements and between contrast shifts may be compared against a given threshold for both outputs. Although such an approach may be data dependent, especially in the case of a contrast shift, a minimum error relative to the maximum possible input intensity may be defined. In other implementations, the effectiveness of the multi-grid algorithm may be determined by applying a calculated deformation and contrast shift to the moving image in order to approximate the fixed image, and then measuring the distance between the fixed and reconstructed image. In various implementations, a level switching rule may be applied where the algorithm may adaptively change resolution levels when the computed distance sufficiently stabilizes and a stopping criteria is reached. In accordance with the present disclosure the change in grid size between successive resolution levels and the interval between metric measurements may be adapted for different types of data and/or datasets.

In various implementations, the deformation field and brightness shift may be refined using interpolation between resolution levels:

$$\Delta \tilde{r}^{i+1} = I_i^{i+1}(\Delta r^i)$$

$$\Delta \tilde{m}^{i+1} = I_i^{i+1}(\Delta m^i) \quad (38)$$

where $I_a^b$ is the interpolation from resolution a to resolution b. The order of the interpolation function may be no less than the order of the differential equations. The multi-grid algorithm may then be defined as follows $$(\Delta r^0, \Delta m^0) = \Phi(f^0, g^0) \quad (39)$$
$$(\Delta r^1, \Delta m^1) = \Phi_{\Delta \tilde{r}^0, \Delta \tilde{m}^0}(f^1, g^1)$$
$$\vdots$$
$$(\Delta r^n, \Delta m^n) = \Phi_{\Delta \tilde{r}^{n-1}, \Delta \tilde{m}^{n-1}}(f^n, g^n)$$

yielding $$f(r) \approx \frac{g(r + \Delta r^n)}{1 + \Delta m^n}. \quad (40)$$

In various implementations, an example multi-grid regression (MG) algorithm may be represented in pseudo code as follows:

```
Δr, Δm ← 0
i ← 0
while i < n do
    f^i ← I_n^i(f), g^i ← I_n^i(g)
    DR(f^i, g^i, Δr, Δm)
    Δr^i ← I_{i-1}^i(Δr^{i-1})
    Δm^i ← I_{i-1}^i(Δm^{i-1})
    i ← i + 1
end while
return (Δr, Δm)
```

The MG algorithm may start with a coarser grid and null deformation fields and contrast shift. The algorithm may then continue in the same resolution level until the stopping criteria has been reached. Then the MG algorithm may increase resolution index i to a refined grid until a finest level n is reached.

The total time T for contrast optical flow without a multi-resolution approach may be calculated as a function of the total number of iterations N and the time needed for each iteration $t_n$ at full resolution. The total time $T^*$ of a multi-grid algorithm in accordance with the present disclosure may be expressed as $$T^* = \sum_{i=0}^{n} t_i N_i^* \quad (41)$$

where for a given level i, $N_i^*$ is the number of iterations needed to converge and $t_i$ is the average iteration time. In implementations where a first-order algorithm is used and sub-sampling by a factor of two between resolution levels is performed, the iteration time scales (neglecting overhead) may be represented by the following series:

$$t \approx \frac{t_{i+1}}{2^d} \quad (42)$$

where d is the dimension of the problem. Reducing the size by a factor of two in all dimensions may allow the deformation to be captured in half of the number of iterations, leading to the following formalization $$N_i^* \approx \frac{N_{i+1}^*}{2}. \quad (43)$$

Eqn. (43) is an approximation that may depend on the frequency content of the solution at a given resolution. If the frequency spectrum is non-uniform, the algorithm may require a larger number of iterations at the resolution that captures the most information. Using this observation, the total time T* may be expressed as follows:

$$T^* \approx t_n N_n^* \sum_{i=0}^{n} 2^{-i(d+1)} < 1.06\overline{6} t_n N_n^* \quad (44)$$

where the sum of the power series given by Eqn. (44) converges to $1.06\overline{6}$ when d=3. Finally, given that the total time without multi-grid techniques may be expressed as $T=t_n N$, the following expression may be obtained $$T^* < 1.06\overline{6}\beta T \quad (45)$$

where $N_n^* = \beta N$. Since $\beta$ directly depends on the uniformity of the spectrum, frequency analysis may be performed to more precisely specify the performance improvement with multi-grid techniques.

In various implementations, pre-processing of data may be useful to initialize the starting deformation as well as the contrast shift for a wide range of data types and/or dataset sizes, dimensionality, resolutions, etc. For example, in some implementations a mean-match may be performed to match overall intensities between fixed and moving volumes. In addition, in various implementations, a noise-reduction filter may be applied to improve the signal to noise ratio and avoid over-fitting noise. Pre-processing steps may reduce the number of iterations required for convergence.

In implementations employing mean-match techniques the following expression may be applied $$f'(r) = \frac{E[g(r)]}{E[f(r)]} f(r), \quad (46)$$

where the new fixed image f' matches the mean value of the moving image. In general, the moving image may have an extended range compared to the range of the fixed image. If that condition is not satisfied, the mean of the moving image may be matched to the mean of the fixed image. This technique may be replaced by other techniques such as histogram equalization techniques.

Due to deformation, some features that are present in a moving image may not be present in a fixed image and vice versa. In addition, a noisy DC component may cause the solution to be unstable as components of the deformation field may be randomly assigned. To identify features with significant gradients defining clear boundaries, the input images may, in various implementations, be preprocessed with an edge detector filter. Such edge filter pre-processing may be employed in cases where artifacts might confuse the diffusion or the voxel spacing may not be uniform and the smoothness constraint may not be completely satisfied. Although processed data may be used to identify a deformation, the final deformation field may be applied to the original moving input to achieve final reconstruction. This technique may preserve the original image content to permit, for example, the assessment of textural information.

In some implementations a Sobel operator of the following form may be employed as a discrete differentiation operator $$S_y = \begin{bmatrix} +1 & +2 & +1 \\ 0 & 0 & 0 \\ -1 & -2 & -1 \end{bmatrix},$$

$$S_x = \begin{bmatrix} +1 & 0 & -1 \\ +2 & 0 & -2 \\ +1 & 0 & -1 \end{bmatrix},$$

$$f' = \|(f^* S_x, f^* S_y)\|$$

the 2D kernel may be expanded to a 3D implementation computing the tensor product of a 1D central difference derivative filter for one axis with a 1D triangular filter for each of the other two. The solution may then be 3 matrices of 3×3×3 size. Defining h(1)=1,h(2)=2,h(3)=1 and h'(1)=1, h'(2)=0,h'(3)=−1 then $\forall i,j,k \in \{1,2,3\}$ $$(S_x)_{ijk} = h'(i)h(j)h(k)$$

$$(S_y)_{ijk} = h'(j)h(i)h(k)$$

$$(S_z)_{ijk} = h'(k)h(i)h(j) \quad (47)$$

Where $S_y$ and $S_z$ may also be obtained by rotating $S_x$.

In some implementations, post-processing may be applied to the results of an MG algorithm. For example, to satisfy smoothness constraint the same regularization function of Eqn. (18) may be applied after the last iteration of the algorithm has been completed. Such post-processing may smooth the deformation field without blurring the resulting reconstruction and also may reduce undesirable artifacts that may be the result of an insufficient sampling between slices during acquisition.

FIG. 1 illustrates a system 100 including an adaptive multi-grid COF module 102 in accordance with the present disclosure. System 100 may be implemented in hardware, software, firmware or any combination thereof. For example, system 100 may be implemented, at least in part, by software and/or firmware instructions executed by or within a computing system such as a system employing a SoC architecture.

COF module 102 may provide for any of the functionality described herein and/or may undertake any of the processes described herein including undertaking the MG and DR algorithms described herein. For instance, COF module 102 may receive datasets corresponding to fixed image data and moving image data as input. For instance, in a non-limiting example, COF module 102 may receive voxel datasets corresponding to fixed image data and moving image data obtained, for example, from medical imaging processes. When undertaking adaptive multi-grid COF processing, module 102 may perform MG and DR algorithms in response to adjustable parameters as described herein. In addition, when performing MG and DR algorithms, module 102 may provide estimated deformation field data and scalar brightness field data as described herein.

Figure 2:
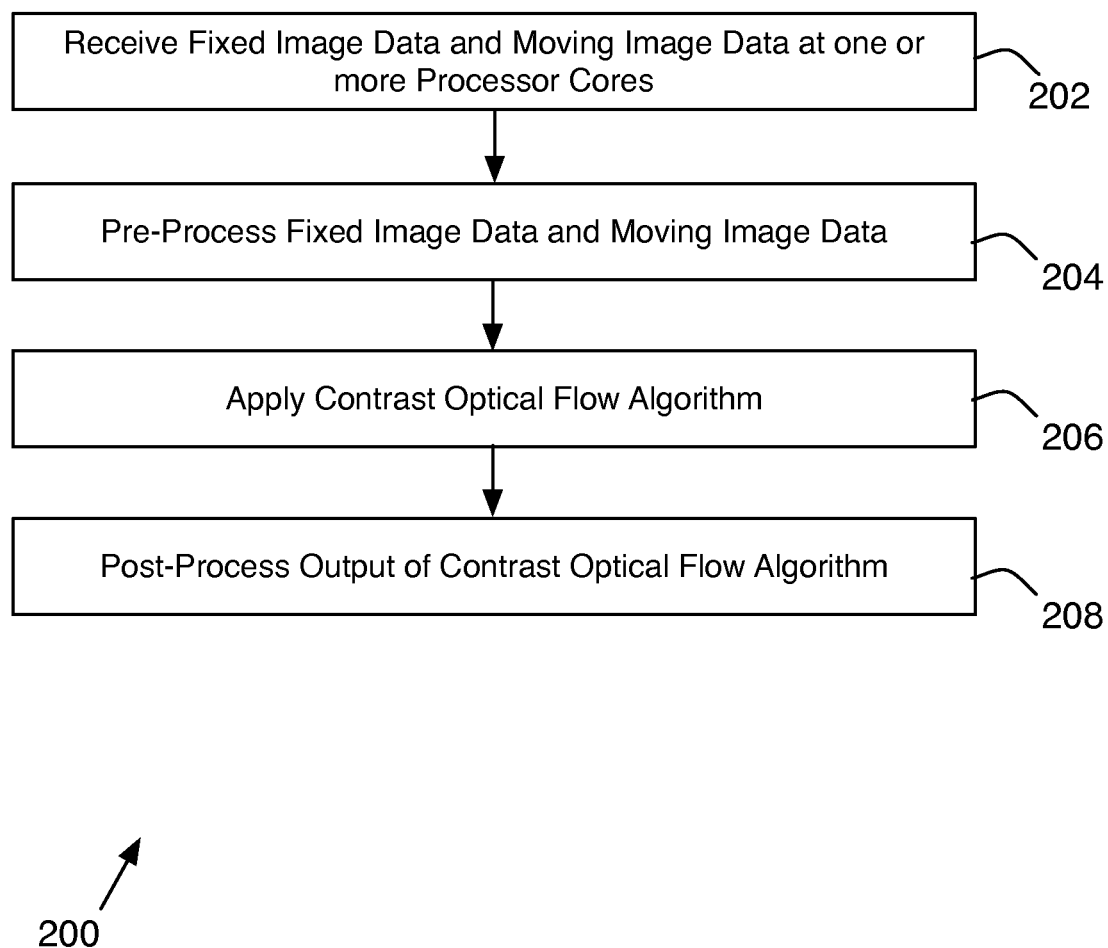
FIG. 2 illustrates an example process.

FIG. 2 illustrates a flow diagram of an example process 200 according to various implementations of the present disclosure. Process 200 may include one or more operations, functions or actions as illustrated by one or more of blocks 202, 204, 206, and 208. While, by way of non-limiting example, process 200 will be described herein in the context of example system 100 of FIG. 1, those skilled in the art will recognize that process 200 may be implemented in various other execution environments. Process 200 may begin at block 202.

At block 202, fixed image data and moving image data may be received at one or more processor cores. For example, block 202 may involve COF module 102 receiving image datasets corresponding to fixed image data and moving image data. In some implementations, the data received in block 202 may be subjected to pre-processing at block 204. For instance, block 204 may include performing at least one of a mean-match between the fixed image data and the moving image data, applying an edge filter to the fixed image data and to the moving image data, or applying a noise filter to the fixed image data and to the moving image data.

In accordance with the present disclosure the image data received at block 202 may have any dimensionality. Thus, while in some implementations the image data received at block 202 may be 3D image data or voxel data, in other implementations the image data received at block 202 may be 2D image data, etc. Further, in accordance with the present disclosure, image data received at block 202 is not limited to any particular type of image data.

At block 204, a COF algorithm may be applied to the fixed image data and the moving image data. Block 204 may include determining a deformation field and a scalar brightness field and applying an affine transformation to changes in intensity between the fixed image data and the moving image data. Further, applying a COF algorithm at block 204 may include performing a MG algorithm and a DR algorithm including, but not limited to, determining a number of deformable registration resolution levels in response to at least one resolution parameter, automatically adjusting the at least one resolution parameter in response to a processor overhead factor, and/or automatically switching deformable registration resolution levels in response to applying a level switching rule. In various implementations, applying a level switching rule may include determining a real-time rate of convergence of the DR algorithm such as determining at least one of an error reduction or a rate of error reduction.

Process 200 may conclude at block 208 where post-processing of the output of the COF algorithm may be performed. For example, block 208 may include applying a regularization function to the deformation field resulting from the last iteration of the COF algorithm.

Figure 3:
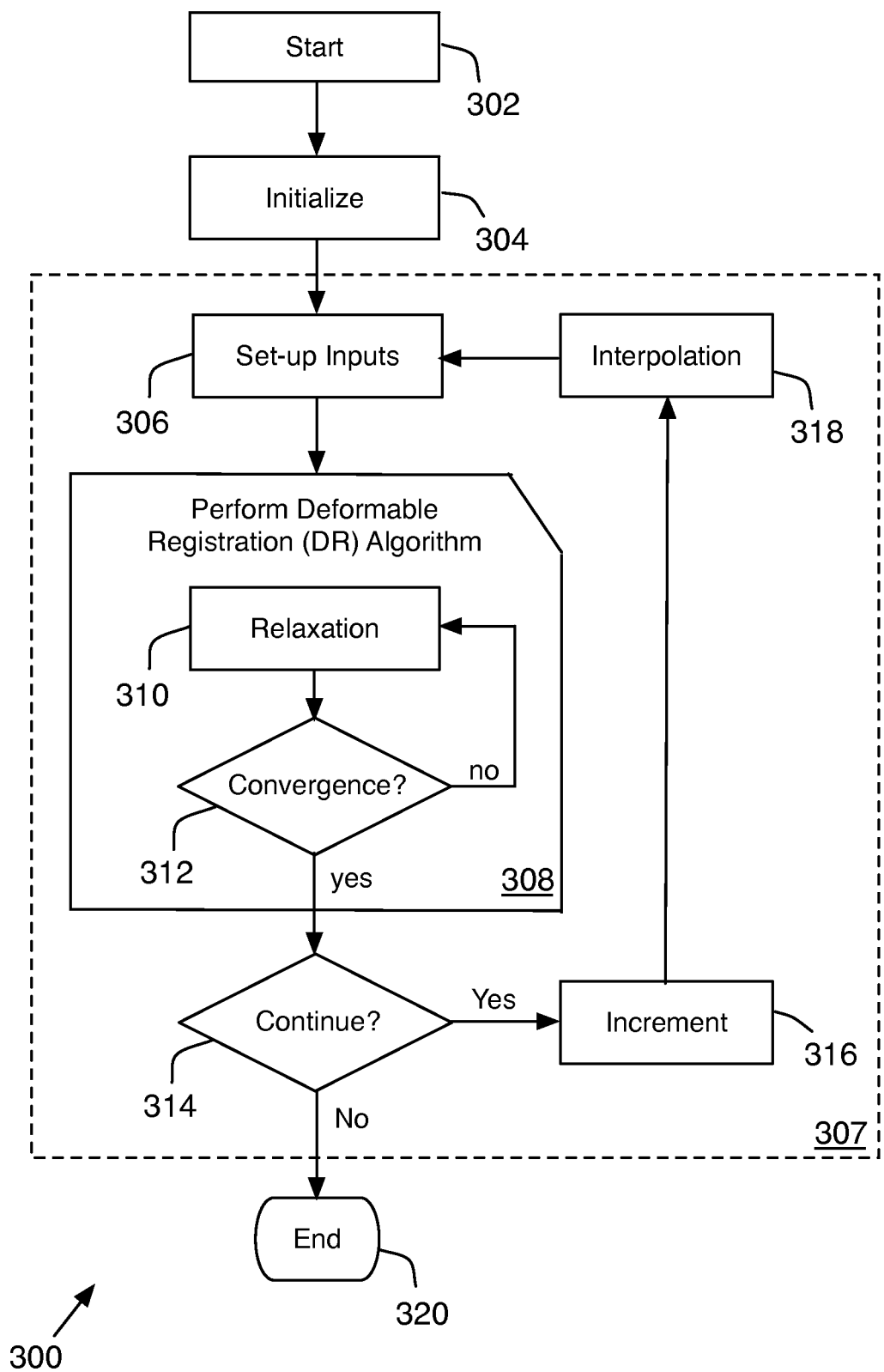
FIG. 3 illustrates an example process.

FIG. 3 illustrates a flow diagram of an example process 300 for implementing a MG algorithm in accordance to various implementations of the present disclosure. Process 300 may include one or more operations, functions or actions as illustrated by one or more of blocks 302, 304, 306, 307, 308, 310, 312, 314, 316, 318, and 320. While, by way of non-limiting example, process 300 will be described herein in the context of example system 100 of FIG. 1, those skilled in the art will recognize that process 300 may be implemented in various other execution environments. Process 300 may begin at block 302.

At block 302 the MG algorithm may begin. For example, an MG algorithm as described herein may be implemented. At block 304 the inputs to the algorithm may be initialized. For instance, the values of the values of the resolution index i, the deformation field Δr, and the scalar brightness field Δm may be set to zero at block 304.

Beginning at block 306, the MG algorithm may enter a looping portion 307. When initially entering looping portion 307, the MG algorithm may load initial values for the fixed image f and the moving image g at block 306. At block 308 a DR algorithm may be performed as described herein including the undertaking of a relaxation process (block 310) and the determination of whether sufficient convergence has occurred in the relaxation process (block 312). In various implementations, block 310 may involve determining $\Delta \bar{r} \leftarrow G_s(r)^* \Delta r$ and $\Delta \bar{m} \leftarrow G_m(r)^* \Delta m$, where the operator (*) corresponds to performing a convolution, and block 312 may involve assessing a stopping criteria or metric $\Gamma$ based on measured MSE, RMSE, NMI or the like. If convergence has not been achieved at block 312, then DR algorithm 308 may loop back to block 310.

If, on the other hand, convergence has been achieved at block 312, then at block 314 a determination may be made as to whether to continue looping portion 307 of the MG algorithm. For instance, block 314 may include determining if the index i, representing the resolution level of the MG algorithm and having the possible values $\{0, 1, 2, \ldots, n\}$, has value i=n. The number n may represent the total number of resolution levels in the MG algorithm as determined by, for example, a resolution parameter as described herein.

If i≠n, then loop portion 307 may continue with incrementing the value of the index at block 316. For example, the resolution index may be given the value of value i=i+1. Subsequently, at block 318, interpolation may be undertaken. For example, block 318 may involve interpolating the values of the deformation field Δr, and the scalar brightness field Δm resulting from the i-th iteration of the DR algorithm 308. The looping portion 307 may then continue with a new instance of blocks 306-312 using the interpolation results of block 318. If the index i has the value i=n at block 314, then the MG algorithm may end at block 320.

Processes 200 and 300 may be undertaken in response to instructions provided by one or more computer program products. Such program products may include signal bearing media providing instructions that, when executed by, for example, a processor, may provide the functionality described above with respect to FIGS. 2-3. The computer program products may be provided in any form of computer readable medium. Thus, for example, a processor including one or more processor core(s) may undertake one or more of the blocks shown in FIGS. 2-3 in response to instructions conveyed to the processor by a computer readable medium.

Figure 4:
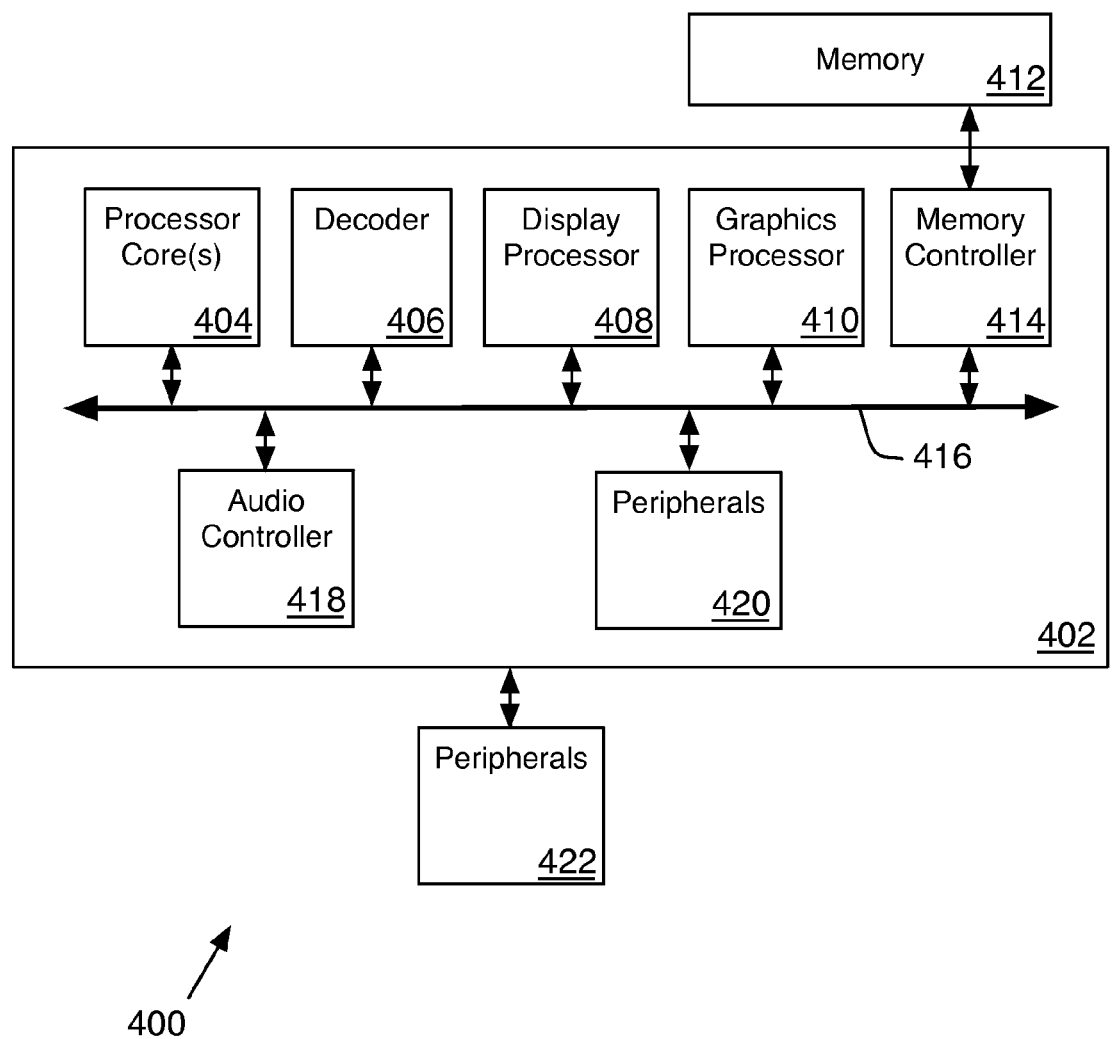
FIG. 4 is an illustrative diagram of an example system, all arranged in accordance with at least some implementations of the present disclosure.

FIG. 4 illustrates an example system 400 in accordance with the present disclosure. System 400 may be used to perform some or all of the various functions discussed herein and may include any device or collection of devices capable of undertaking multi-grid contrast optical flow algorithms in accordance with various implementations of the present disclosure. For example, system 400 may include selected components of a computing platform or device such as a desktop, mobile or tablet computer, a smart phone, etc., although the present disclosure is not limited in this regard. In some implementations, system 400 may be a computing platform or SoC based on Intel® architecture (IA). It will be readily appreciated by one of skill in the art that the implementations described herein can be used with alternative processing systems without departure from the scope of the present disclosure.

System 400 includes a processor 402 having one or more processor cores 404. Processor cores 404 may be any type of processor logic capable at least in part of executing software and/or processing data signals. In various examples, processor cores 404 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor or microcontroller. While not illustrated in FIG. 4 in the interest of clarity, processor 402 may be coupled to one or more co-processors (on-chip or otherwise). Thus, in various implementations, other processor cores (not shown) may be configured to undertake multi-grid contrast flow algorithms in conjunction with processor 402 in accordance with the present disclosure. For instance, one or more remote co-processor core(s) coupled to processor 402 by, for example, a network (also not shown), may be configured to undertake multi-grid contrast flow algorithms in conjunction with processor 402 in accordance with the present disclosure. Further, in various implementations, processor core(s) 404 may be heterogeneous core(s), although the present disclosure is not limited in this regard.

Processor 402 also includes a decoder 406 that may be used for decoding instructions received by, e.g., a display processor 408 and/or a graphics processor 410, into control signals and/or microcode entry points. While illustrated in system 400 as components distinct from core(s) 404, those of skill in the art may recognize that one or more of core(s) 404 may implement decoder 406, display processor 408 and/or graphics processor 410. In some implementations, core(s) 404 may be configured to undertake any of the processes described herein including the example processes described with respect to FIGS. 2-3. Further, in response to control signals and/or microcode entry points, core(s) 404, decoder 406, display processor 408 and/or graphics processor 410 may perform corresponding operations.

Processing core(s) 404, decoder 406, display processor 408 and/or graphics processor 410 may be communicatively and/or operably coupled through a system interconnect 416 with each other and/or with various other system devices, which may include but are not limited to, for example, a memory controller 414, an audio controller 418 and/or peripherals 420. Peripherals 420 may include, for example, a unified serial bus (USB) host port, a Peripheral Component Interconnect (PCI) Express port, a Serial Peripheral Interface (SPI) interface, an expansion bus, and/or other peripherals. While FIG. 4 illustrates memory controller 414 as being coupled to decoder 406 and the processors 408 and 410 by interconnect 416, in various implementations, memory controller 414 may be directly coupled to decoder 406, display processor 408 and/or graphics processor 410.

In some implementations, system 400 may communicate with various I/O devices not shown in FIG. 4 via an I/O bus (also not shown). Such I/O devices may include but are not limited to, for example, a universal asynchronous receiver/transmitter (UART) device, a USB device, an I/O expansion interface or other I/O devices. In various implementations, system 400 may represent at least portions of a system for undertaking mobile, network and/or wireless communications.

System 400 may further include memory 412. Memory 412 may be one or more discrete memory components such as a dynamic random access memory (DRAM) device, a static random access memory (SRAM) device, flash memory device, or other memory devices. While FIG. 4 illustrates memory 412 as being external to processor 402, in various implementations, memory 412 may be internal to processor 402. Memory 412 may store instructions and/or data represented by data signals that may be executed by the processor 402. In some implementations, memory 412 may store stored data such as fixed image and moving image datasets.

The systems described above, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

What is claimed:

1. A method, comprising:
at one or more processor cores,
receiving fixed image data and moving image data; and
applying a contrast optical flow (COF) algorithm to the fixed image data and the moving image data, wherein applying the COF algorithm includes determining a deformation field and a scalar brightness field, and wherein applying the COF algorithm includes applying an affine transformation to changes in intensity between the fixed image data and the moving image data.

2. The method of claim 1, wherein applying the COF algorithm includes applying a deformable registration (DR) algorithm.

3. The method of claim 2, wherein applying the DR algorithm comprises:
determining a number of deformable registration resolution levels in response to at least one resolution parameter.

4. The method of claim 3, further comprising:
automatically adjusting the at least one resolution parameter in response to a processor overhead factor.

5. The method of claim 2, wherein applying the DR algorithm comprises automatically switching deformable registration resolution levels in response to applying a level switching rule.

6. The method of claim 5, wherein applying the level switching rule comprises determining a real-time rate of convergence of the DR algorithm.

7. The method of claim 6, wherein determining the real-time rate of convergence of the DR algorithm comprises determining at least one of an error reduction or a rate of error reduction.

8. The method of claim 1, wherein applying the affine transformation includes determining a contrast shift represented by at least a scale factor.

9. The method of claim 1, further comprising:
performing at least one of a mean-match between the fixed image data and the moving image data, applying an edge filter to the fixed image data and to the moving image data, or applying a noise filter to the fixed image data and to the moving image data.

10. The method of claim 1, further comprising:
applying a regularization function to the deformation field.

11. A system, comprising:
memory to store fixed image data and moving image data; and
one or more processor cores coupled to the memory, wherein the one or more processor cores are configured to receive the fixed image data and the moving image data from the memory and to apply a contrast optical flow (COF) algorithm to the fixed image data and the moving image data, wherein when configured to apply the COF algorithm, the one or more processor cores are configured to determine a deformation field and a scalar brightness field, and to apply an affine transformation to changes in intensity between the fixed image data and the moving image data.

12. The system of claim 11, wherein when configured to apply the COF algorithm the one or more processor cores are configured to apply a deformable registration (DR) algorithm.

13. The system of claim 12, wherein when configured to apply the DR algorithm the one or more processor cores are configured to determine a number of deformable registration resolution levels in response to at least one resolution parameter.

14. The system of claim 12, wherein applying the DR algorithm comprises automatically switching deformable registration resolution levels in response to determining a real-time rate of convergence of the DR algorithm.

15. A non-transitory computer readable medium having stored therein instructions that, if executed, result in:
at one or more processor cores,
receiving fixed image data and moving image data; and
applying a contrast optical flow (COF) algorithm to the fixed image data and the moving image data, wherein applying the COF algorithm includes determining a deformation field and a scalar brightness field, and wherein applying the COF algorithm includes applying an affine transformation to changes in intensity between the fixed image data and the moving image data.

16. The computer readable medium of claim 15, wherein applying the COF algorithm includes applying a deformable registration (DR) algorithm.

17. The computer readable medium of claim 16, wherein applying the DR algorithm comprises determining a number of deformable registration resolution levels in response to at least one resolution parameter.

18. The computer readable medium of claim 17, further having stored therein instructions that, if executed, result in:
automatically adjusting the at least one resolution parameter in response to a processor overhead factor.

19. The computer readable medium of claim 16, wherein applying the DR algorithm comprises automatically switching deformable registration resolution levels in response to determining a real-time rate of convergence of the deformable registration algorithm.

20. The computer readable medium of claim 15, wherein applying the affine transformation includes determining a contrast shift represented by at least a scale factor.

* * * * *